(12) United States Patent
Breiter et al.

(10) Patent No.: US 6,591,021 B1
(45) Date of Patent: Jul. 8, 2003

(54) METHOD AND APPARATUS FOR CORRECTING THE GRAY LEVELS OF IMAGES OF A DIGITAL INFRARED CAMERA

(75) Inventors: Rainer Breiter, Heilbronn (DE); Wolfgang Cabanski, Heilbronn (DE); Karl-Heinz Mauk, Bad Friedrichshall (DE)

(73) Assignee: AEG Infrarot-Module GmbH, Heilbronn (DE)

( * ) Notice: Subject to any disclaimer, the term of this patent is extended or adjusted under 35 U.S.C. 154(b) by 0 days.

(21) Appl. No.: 09/288,355

(22) Filed: Apr. 8, 1999

(30) Foreign Application Priority Data

Apr. 9, 1998 (DE) .......................................... 198 16 003

(51) Int. Cl.[7] .............................. G06T 5/00; G01J 5/02; G06B 26/10; H04N 5/33
(52) U.S. Cl. ...................... 382/274; 382/299; 348/164; 348/251; 250/347; 250/252.1
(58) Field of Search ................................ 382/274, 299; 358/461, 482, 477, 446; 348/164, 243, 246, 251; 250/252.1, 208.1, 214 AG, 332, 338.1, 338.4, 347, 348, 353

(56) References Cited

U.S. PATENT DOCUMENTS 4,053,773 A * 10/1977 Deresh et al. ............... 250/347
4,298,887 A * 11/1981 Rode .......................... 348/164

(List continued on next page.)

FOREIGN PATENT DOCUMENTS

| DE | 69106636 | 5/1995 |
|---|---|---|
| DE | 19502860 | 4/1996 |
| DE | 19715983 | 9/1998 |
| EP | 0479383 | 4/1992 |
| EP | 0600742 | 6/1994 |
| EP | 0680206 | 11/1995 |
| EP | 0758831 | 2/1997 |
| FR | 2726144 | 4/1996 |
| GB | 2250155 | 5/1992 |
| GB | 2250884 | 6/1992 |
| WO | WO93/09463 | 5/1993 |

OTHER PUBLICATIONS

"Electronic LOS Jitter Compensation for Staring Sensor", by Martin G. Woolfson; SPIE vol. 1762 Infrared Technology XVIII, (1992), pp. 317 to 326.

"Aliasing reduction in staring infrared imagers utilizing subpixel techniques"; by Gillette et al.; Optical Engineering, Nov. 1995, vol. 34, No. 11; pp. 3130 to 3137.

*Primary Examiner*—Scott Rogers
(74) *Attorney, Agent, or Firm*—W. F. Fasse; W. G. Fasse

(57) ABSTRACT

To correct the gray levels or pixel intensities of images provided by a digital infrared camera having a two-dimensional array of detector elements with non-sensitive areas therebetween, correction coefficients respectively allocated to the detector elements are stored in a memory of an image processing system. The gray levels of image pixels are corrected by the respective corresponding correction coefficients. The correction coefficients are progressively updated and improved by means of a dynamic correction process. To distinguish stationary features in a scene being viewed from non-uniformities among the detector elements so that such stationary features do not influence the updating of the correction coefficients, the image of the scene incident on the detector is moved relative to the detector, by means of a microscanner deflecting the image beam incident, on the detector. The image is preferably moved to respective positions spaced apart from each other by one half of the physical spacing between adjacent detector elements, and the sequence of movement is selected to minimize the time-spacing between respective image data to be read-out.

16 Claims, 4 Drawing Sheets

U.S. PATENT DOCUMENTS

| | | | | |
|---|---|---|---|---|
| 4,695,722 A | * | 9/1987 | Motooka | 250/347 |
| 5,180,912 A | | 1/1993 | McEwen et al. | |
| 5,323,334 A | | 6/1994 | Meyers et al. | |
| 5,514,865 A | * | 5/1996 | O'Neil | 250/208.1 |
| 5,866,900 A | * | 2/1999 | Jacobson et al. | 250/252.1 |
| 5,925,880 A | * | 7/1999 | Young et al. | 250/252.1 |
| 6,069,357 A | * | 5/2000 | Caron et al. | 250/347 |
| 6,075,903 A | | 6/2000 | Breiter et al. | |
| 6,184,527 B1 | * | 2/2001 | Young | 250/252.1 |

* cited by examiner

METHOD AND APPARATUS FOR CORRECTING THE GRAY LEVELS OF IMAGES OF A DIGITAL INFRARED CAMERA

CROSS-REFERENCE TO RELATED APPLICATION

This application is related to U.S. application Ser. No. 09/061,147, filed on Apr. 16, 1998, and issued on Jun. 13, 2000 as U.S. Pat. No. 6,075,903 and entitled "PROCESS FOR CORRECTING THE INTENSITY OF IMAGES FROM A DIGITAL INFRARED CAMERA", the entire disclosure of which is incorporated herein by reference.

PRIORITY CLAIM

This application is based on and claims the priority under 35 U.S.C. §119 of German Patent Application 198 16 003.8, filed on Apr. 9, 1998, the entire disclosure of which is incorporated herein by reference.

FIELD OF THE INVENTION

The invention relates to a method for correcting the gray levels or pixel intensities of images-produced by a digital infrared camera having a two-dimensional infrared detector array, wherein the gray level value for each image pixel is corrected by a stored correction coefficient.

BACKGROUND INFORMATION

The German company AEG Infrarot Module GmbH (AIM) has been producing high grade infrared detectors and associated components such as coolers and output electronics since the 1970s. Such detectors are typically used in military, research, medical, and industrial applications. In older one-dimensional or line detectors, a one-dimensional line of photosensitive detector elements cooperated with a mechanical scanner so as to successively scan a scene line-by-line so as to generate a complete image therefrom. In the newest generation of detectors, the individual photosensitive elements are arranged in a two-dimensional array over a surface plane of the detector. Since the array of elements directly receives a complete image over the two-dimensional array plane, such two-dimensional detectors no longer need a mechanical scanner for generating a complete two-dimensional image. In other words, using a two-dimensional detector, a scene can be directly imaged onto a photosensitive array chip using a suitable optics system. The respective output signals of the individual photosensitive elements are serially read-out and then reconstructed into a two-dimensional data structure representing the corresponding image, by means of a suitable electronic image processing circuit and procedure.

Due to technical reasons and limitations, any two-dimensional infrared detector comprising a two-dimensional array of individual photosensitive elements necessarily exhibits inhomogeneities or non-uniformities among the several individual elements. These non-uniformities can include constant or invariable non-uniformities as well as time-varying non-uniformities. In any event, such non-uniformities cause imaging errors or aberrations in the electronic capture and reproduction of the true or actual image. This arises because a difference in the output signal of a given detector element relative to the outputs of the other elements would initially be regarded as arising from a feature of the real scene being viewed, even though such a difference might actually arise do to a non-uniformity of the respective detector element.

The problem of distinguishing between scene-based features and detector-based non-uniformities is most readily apparent when all of the detector elements are detecting a neutral uniform scene without any characteristic features. In such a case, it can be assumed that any difference in output signals of the several detector elements arises from detector-based non-uniformities. However, the imaging errors resulting from non-uniformities become especially problematic and difficult to recognize and correct when the detector is "seeing" or imaging a scene that includes features having different image pixel intensities, because then the detector elements will produce respective differing output signal intensities resulting from both the true differences in the scene as well as the non-uniformities of the individual detector elements. In this regard, features in the scene that move relative to the detector can be recognized as such real features, because the variation in pixel intensity associated with such a moving feature will move across several detector elements. On the other hand, stationary scene-based features will constantly affect the output intensity of a particular one or more detector elements of a stationary detector, and the output signals are therefore prone to be incorrectly interpreted as resulting from a detector-based non-uniformity in the respective affected element or elements.

European Patent Application 0,600,742, published on Jun. 8, 1994, and corresponding U.S. Pat. No. 5,323,334 (Meyers et al.), issued on Jun. 21, 1994 discuss the above mentioned problem relating to the recognition and correction of imaging errors resulting from non-uniformities among the individual photosensitive elements of a detector or sensor array. The entire disclosure of U.S. Pat. No. 5,323,334 is incorporated into the present application by reference, excepting any subject matter that may be further incorporated by reference into U.S. Pat. No. 5,323,334.

EP 0,600,742 and U.S. Pat. No. 5,323,334 also both disclose a system for carrying out such correction or suppression of imaging errors resulting from sensor element non-uniformities. In the known system, the sensor or detector array is mounted on a sensor positioner, which physically moves the sensor relative to the incident image of the external scene falling on the sensor. The sensor is physically moved in order to distinguish between detector-based non-uniformities on the one hand and features in the real scene being viewed by the sensor on the other hand. As the sensor is moved by the sensor positioner, a sensor-based non-uniformity will move with the sensor, i.e. will always remain associated with a particular element of the sensor, while a real feature in the scene will move relative to the sensor, i.e. will successively fall on different elements of the sensor (unless the feature happens to follow exactly the same motion as the sensor, which can be avoided by proper choice of the motion pattern). A non-uniformity compensator is the used to recognize and correct or compensate the detector-based non-uniformities by processing the output signal of the sensor. Thereafter, a position corrector circuit electronically corrects the output signals by the inverse or opposite of the physical motion of the sensor, so that the image information is electronically shifted back to its true position, i.e. to counteract the physical motion of the sensor.

While the known system of the above discussed references uses a valid concept or theory for recognizing and correcting sensor-based non-uniformities, problems arise in connection with the physical movement of the sensor itself. The mechanical actuators, gimbals and the like used for mounting and moving the sensor are subject to wear as well as mechanical tolerances and inaccuracies. Also, especially for larger sized sensor arrays, the size and mass of the sensor array makes it difficult to accurately and rapidly physically move the entire array.

German Patent 197 15 983, published on Sep. 24, 1998 and corresponding U.S. patent application Ser. No. 09/061,147, which is cross-referenced and incorporated by reference herein, are not prior art relative to the present application. Instead, the present application represents a further development that is preferably used in combination with the method and apparatus for correcting the gray levels of images produced by a digital infrared camera by means of electronic signal processing as disclosed in German Patent 197 15 983 and corresponding U.S. Pat. application Ser. No. 09/061,147.

In the system according to German Patent 197 15 983 and U.S. patent application Ser. No. 09/061,147, a signal processing arrangement includes a memory in which respective correction coefficients K for each detector element j of the detector are stored, and the associated signal processing method comprises the following steps. First, the respective gray levels or pixel intensities Uj of a scene are acquired as image data by the detector. Next, the gray levels Uj of the image are corrected through use of the correction coefficients K in the image processing system, and the resulting corrected gray levels Uke are intermediately stored. Then the corrected gray levels UkG are filtered through a locally effective adaptive filter M, to produce filtered corrected gray levels F(Ukj). The remaining image error or aberration ej is then determined by using the gray levels Ukj of the unfiltered corrected image and the gray levels F(Ukj) of the filtered corrected image. Then the correction coefficients K are progressively updated or improved in connection with this determined remaining image error ej. Finally, the improved or updated correction coefficients K are stored in the corresponding memory of the image processing system.

The system according to German Patent 197 15 983 and U.S. patent application Ser. No. 09/061,147 is generally effective for correcting images from a digital camera in order to compensate for the above described non-uniformities. However, that system by itself, does not overcome the problem that a stationary object or feature in the real external scene having a high spatial frequency or sharp image variation characteristic, such as a distinct edge for example, is continuously recognized and resolved by the correction method and thus has an influence on the updating of the correction coefficients. As a result, the updated correction coefficients have a tendency to compensate for such stationary objects or features in the scene, which has two consequences. First, such stationary features are progressively masked or compensated out of the resulting image. Secondly, when the detector thereafter views a different scene, e.g. when the detector moves or when the previously stationary features move, an inverse or ghost image of the stationary features will be produced in the resulting image due to the compensating effect of the updated correction coefficients.

SUMMARY OF THE INVENTION

In view of the above, it is an object of the invention to provide a method and an apparatus for correcting the gray levels or pixel intensities of images produced by a digital infrared camera, which are improved so that stationary features in a scene do not have an influence on the updating of the correction coefficients. Particularly such a method and apparatus should avoid the progressive masking of stationary features of a scene and the formation of ghost-images associated with such stationary features. It is a further aim of the invention to achieve, in combination, all of the advantages of the above discussed methods and apparatuses, while avoiding or overcoming the disadvantages of the prior art.

The above objects have been achieved according to the invention in a method for correcting the gray levels or pixel intensities of images produced by a digital infrared camera having a two-dimensional detector. According to the inventive method, correction coefficients $K_j$ for each respective detector element j are stored in a memory of an image processing system, and these correction coefficients $K_j$ are continuously updated or improved by means of a dynamic correction process. The progressively improved correction coefficients are used to progressively remove the influence of non-uniformities in the image data. Further according to the method, the image of the scene incident on the detector and/or the detector are moved relative to each other. Particularly according to the invention, the incident image is moved relative to the detector, while the detector itself is not physically moved. This is preferably achieved by providing a microscanner in the incident optical path of the infrared detector so that the microscanner selectively and controllably directs the image onto the detector and moves the image relative to the detector.

Due to the motion of the image on the detector, the location of image features falling on the detector will move among the several detector elements, so that the image processing can distinguish a stationary feature of the scene from a detector-based non-uniformity. Thus, the above described correction coefficients can be progressively updated or improved without being affected by the stationary features in a scene, and especially such stationary features having a high image variation frequency like a distinct edge, for example. Also, the use of a microscanner allows the detector to be stationary fixed in the camera, which simplifies the structure and use of the apparatus and method.

It is further provided that the incident image and the detector are preferably moved cyclically relative to each other, i.e. the image is moved cyclically relative to the detector, so that this relative motion can be easily achieved by any periodic motion arrangements that are typically known in scanners. Also in this case, the evaluation and image processing can be carried out in a correspondingly simple manner.

According to a further advantageous embodiment of the inventive method, the relative movement of the image on the detector has a magnitude or distance corresponding to a fractional portion of the spacing between the centers of neighboring ones of the individual elements of the detector as measured in the direction of the relative motion between the image and the detector. It is especially advantageous if the magnitude or distance of the relative motion corresponds to one half of the spacing between the centers of the detector elements in the relative motion direction. In this manner it is possible to carry out a suitable processing of the image data to achieve an effective doubling of the spatial resolution of the image in comparison to the actual physical spatial resolution of the detector.

A further embodiment feature of the invention provides that the cyclical motion of the image relative to the detector is carried out in a sequence of positions so that positions between respective closest neighboring detector elements are taken up first and then positions between more-distant detector elements are taken up in sequence. Such a particular path or pattern of the motion of the image on the detector serves to optimize, i.e. minimize, the time between respective successive partial images or fields that will be combined or interlaced to provide a complete image or frame of higher resolution.

It is especially preferred that four respective partial images or fields corresponding to four respective positions of the image incident on the detector are combined, e.g. interlaced, to form a single complete image or frame having a doubled spatial resolution. In this context, the correction coefficients are applied to each partial image or field to carry out the above mentioned correction before the fields are combined to form the complete image or frame.

The above objects have further been achieved according to the invention in a digital infrared camera including a two-dimensional infrared sensitive detector, an image processing system, and a microscanner arranged in the incident, optical path of the infrared camera. The image processing system includes a memory in which respective correction coefficients $K_j$ for each detector element j of the detector are stored, and a processing circuit in which a dynamic correction process is carried out to continuously update or improve the stored values of the correction coefficients $K_j$. The microscanner is adapted and arranged to controlledly move the image incident on the detector relative to the detector by suitably deflecting the incident beam of infrared radiation.

DESCRIPTION OF THE DRAWINGS

In order that the invention may be clearly understood it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

The invention serves to correct or improve the image data acquired by an infrared detector mosaic or array viewing a real scene, so that the image data more accurately corresponds to and represents the real scene, with an improved spatial resolution and without image errors caused by non-uniformities among the detector elements of the detector array. One aspect of the improvement of the image data according to the invention is achieved by providing an optical arrangement, and particularly a so-called microscanner, in the incident beam path of the incident image falling on the detector array. The microscanner serves to move the incident image step-wise in a sequence of intermediate positions on the detector array.

Figure 1:
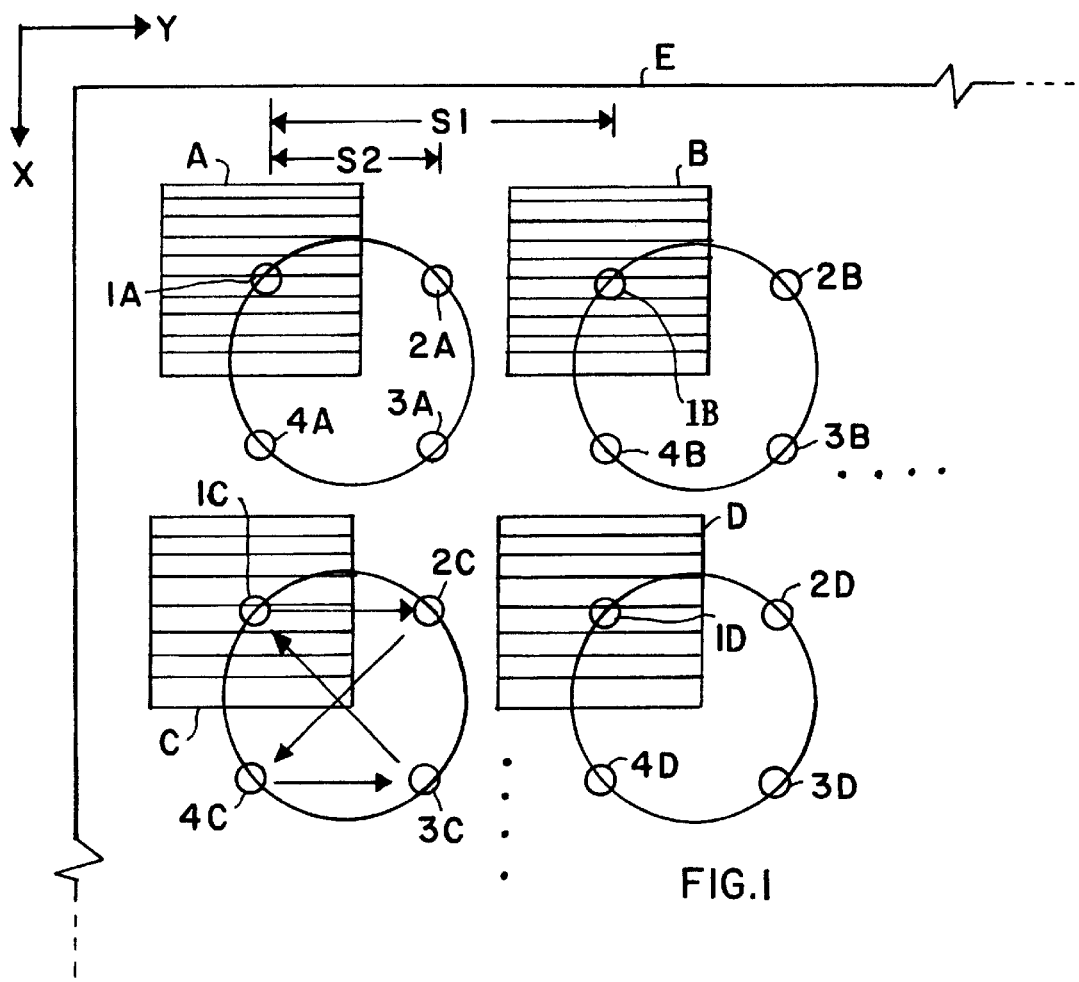
FIG. 1 is a schematic illustration of a portion of a detector including four detector elements, also representing the motion of the center of an image pixel of a scene incident on the detector relative to the detector elements.

This first aspect of the invention is schematically illustrated in FIG. 1, which shows a portion of a detector array E including four pixels or IR sensitive detector elements A, B, C and D. Only four detector elements A, B, C and D have been shown for clarity and simplicity, but the actual detector array E may include a much greater number of detector elements arranged in a two-dimensional array, for example including 110592 elements arranged in 384 columns respectively extending in an X-direction by 288 lines or rows respectively extending in a Y-direction. The IR sensitive surfaces of the respective detector elements A, B, C and D have been shown with hatch lines for purposes of illustration. The detector elements A, B, C and D are respectively spaced from closest neighboring ones of said elements by a center-to-center element spacing distance S1, while non-photosensitive areas remain between the respective photosensitive areas of the detector elements A, B, C and D.

FIG. 1 further schematically shows four successive positions 1, 2, 3 and 4 of a respective feature or pixel center of the image of the actual scene incident on the detector array E as the image moves relative to the detector. Namely, as the microscanner moves the image on the detector array E, the image pixels or features successively move among the positions 1, 2, 3 and 4 relative to the detector, in a sequence as will be discussed in detail below. Thus, a given feature or image pixel moves among the positions 1A, 2A, 3A and 4A, with respect to the detector element A, a given feature or image pixel moves among the positions 1B, 2B, 3B and 4B with respect to the detector element B, a given feature or image pixel moves among the positions 1C, 2C, 3C and 4C with respect to the detector element C, and a given feature or image pixel moves among the positions 1D, 2D, 3D and 4D with respect to the detector element D. The positions 1, 2, 3, and 4 are preferably arranged in a rectangular grid or especially a square grid pattern wherein the positions are spaced from each other in the X-direction and the Y-direction by a distance S2 corresponding to a fraction of the element spacing S1, and especially corresponding to one half of the element spacing S1.

The microscanner is not shown in FIG. 1, but it can comprise any known-components or apparatus for moving an optical image relative to a detector array. For example, the microscanner can be an opto-mechanical system including optical elements such as a fixed optics system as well as a movable element such as a mirror, prism or lens for deflecting an incident image beam and thereby moving the projected beam image relative to the detector array onto which it is directed. Alternatively, the microscanner can include an opto-electronic system whereby the incident image is electronically moved and reprojected onto the detector array in any known manner.

By moving the image incident on-the detector array E successively among the positions 1, 2, 3 and 4 as shown in FIG. 1, by means of the microscanner, the present system achieves a closer-spaced sampling and thus a higher spatial resolution of the scene than the physical resolution of the detector that would otherwise directly correspond to the prescribed total number of detector elements A, B, C, D, etc. and their respective spacing S1. For example, the physical array of 384 by 288 detector elements can provide an image resolution of 768 by 576 image pixels according to the present method. This can be achieved, because for each movement or position change of the image on the detector array E caused by the microscanner, all of the detector elements A, B, C, D, etc. of the detector array E respectively view a different pixel or a different point of the scene being observed. Thus, the image information incident on a particular detector element A, B, C or D of the detector array E does not correspond strictly and constantly to a particular pixel or point in the actual scene, but instead corresponds to a sequence of incident IR radiation data successively emanating from different pixels or points of the actual scene.

Also do to the above described moving of the image on the detector, even stationary features in the actual scene will not be constantly and stationary detected by a single given detector element of the detector array, but instead such a stationary feature will move relative to the respective detector element in accordance with the positions 1, 2, 3 and 4 as shown in FIG. 1. For this reason, a non-uniformity correction circuit and method, such as the circuit and method described in German Patent 197 15 983 and corresponding U.S. patent application Ser. No. 09/061,147 for example, may be used to process and correct the image data output by the detector array E in order to recognize and correct for any non-uniformities of the detector array, without requiring the use of reference beam sources, without any movement in the actual scene being viewed, and without any movement of the detector relative to the actual scene. Stationary objects or features in the scene having a high spatial frequency, for example sharp edge features and the like, will be recognized as scene-based features due to the movement of the image on the detector array, so that such features will not have any influence on the image processing and correction method.

In the present example embodiment shown in FIG. 1, the image of the actual scene is successively moved among four different positions, whereby the detector array E successively views and provides image data respectively corresponding to four partial images or fields that must then be combined, e.g. interlaced, to form a single complete image or frame. In other words, it will be necessary to use a plurality of (in this case four) read-out cycles of the entire detector array E in order to provide the four partial images or fields that will be combined into one complete image or frame having a higher resolution in connection with a lower number or area density of detector elements A, B, C and D, as is achieved by using the microscanner for moving the image relative to the detector array E. As a result, the complete image or frame will then include image data that were illuminated or observed and read-out at four different positions and four different points in time. The order in which the image is moved to the successive positions 1, 2, 3 and 4 on the detector array E is significant for optimizing the recombination, e.g. interlacing, of the four partial images or fields.

It is possible to simply move the image in a circular pattern in sequence among the positions 1-2-3-4-1- . . . etc. Such a sequence can be very easily and smoothly achieved by means of the present microscanner. However, such a movement or repositioning pattern is not the optimum with respect to the speed at which the partial images or fields can be acquired and combined. Namely, with such a circular pattern of positions 1-2-3-4-1- . . . etc., at least some immediately adjacent image pixels will be generated from respective successive positions that are time-spaced from each other by epochs of up to one complete image or frame interval, which is typically about 40 msec for example. This would be the case for the positions 1 and 4 if the positions 1, 2, 3 and 4 are taken up successively in a clockwise circular sequence. Alternatively, this would apply to the positions 1 and 2 if the sequence of positions follows a counterclockwise 1-4-3-2-1 circular pattern.

In view of the above, the invention preferably uses a non-circular pattern and sequence of the positions 1, 2, 3 and 4, namely whereby the positions are successively taken up in the order 1-2-4-3-1- . . . etc. as shown in connection with the positions 1C, 2C, 3C and 4C associated with the detector element C in FIG. 1. With such an X-pattern or "bow tie" pattern, there will be a minimized or optimized time difference between each two successive neighboring image pixels and between two successive image lines in connection with the line-by-line read-out of the image data provided by the detector elements. Namely, image data respectively belonging to the epochs corresponding to the positions 1 and 2 are only one fourth of a complete image or frame interval apart from each other, which is also true for the image data of the epochs corresponding to the positions 3 and 4. Similarly, the switch from the first line to the second line, i.e. from the image data associated with position 2 to the image data associated with position 4 also involves a time spacing of only one fourth of a frame interval. On the other hand, image data from the epochs corresponding to positions 1 and 4, or image data from the epochs corresponding to the positions 2 and 3 are respectively time-spaced from each other by one half of a frame interval. Thus, it is apparent that the longest time spacing between closest neighboring image pixels is reduced by a factor of two when compared to a different motion sequence or pattern, such as the circular pattern of positions 1-2-3-4-1 described above. This feature is important for efficiently and rapidly carrying out the automatic further processing of the image data, for example in target trackers and the like.

As discussed above, infrared detectors having a plurality of detector elements will necessarily exhibit non-uniformities in the produced image due to non-uniformities among the several photosensitive elements and/or time variations in the sensitivity of any given element, for example resulting from unavoidable tolerances in the production of the elements and the overall detector. Even a detector having only one photosensitive element will exhibit time-varying non-uniformities or instabilities. These non-uniformities result in image errors represented as intensity variations in the image, which are apparent and do not disappear even when observing or viewing a completely homogeneous scene without any distinctive IR/thermal signature. These errors especially lead to significant imaging errors in connection with dynamic scenes in which the effect of actual intensity variations resulting from changes in the scene are superimposed on the variations resulting from non-uniformities. More particularly, such image-errors can be formally represented as the inhomogeneous or non-uniform distribution of the d.c. background or offset and of the gain characteristic of individual pixels relative to the average characteristics for the overall image. The suppression or correction of these image errors resulting from such non-uniformities can be carried out using any known suitable hardware and software, which are generally known as non-uniformity correction (NUC) systems in the art.

Thus, according to the present invention, the use of a micro-scanner interposed in the incident beam path of the detector array for systematically moving or repositioning the image on the detector array can be combined with any non-uniformity correction (NUC) system known in the art. However, especially according to the invention it is preferred to combine the microscanner with a detector array and the particular inventive NUC system described in German Patent 197 15 983 as well as U.S. patent application Ser. No. 09/061,147.

The preferred-combination according to the invention achieves the following advantages. First, the factory calibration of the detector is adequate for actually correcting the non-uniformities of the detector in real time, without requiring complicated and costly on-site measures or rapidly moving pseudo-randomized scenes for the purpose of calibration or correction. Secondly, the invention achieves the ability to compensate time-varying instabilities in the detector by means of an automatically self-learning observer algorithm that recognizes and removes new dynamically arising non-uniformities while maintaining substantially all real scene information to the greatest extent possible.

Thirdly, the invention increases the geometric resolution of the detector by means of the microscan, while simultaneously minimizing the time-spacing of successive image pixels.

By carrying out the present method, it is possible to operate even thermally and time-varying instable detectors, such as HgCdTe detectors operating in the long wave IR range of 8 to 10 $\mu$m wavelength, without a degradation of the image resulting from non-uniformities, after having once initially exactly measured and evaluated the detector to identify all of the non-uniformities including non-linear effects, and without requiring a repeated recalibration. Moreover, the method automatically adapts itself to dynamic scenes within the scope or range in which the initial exact measurement and evaluation of the detector was carried out. After operating for a suitable learning period of the observer algorithm, the present method can provide well-corrected detector image data even in the case of instabilities in the operating conditions or significantly varying scene temperatures, and without requiring a recalibration under the varied or different conditions.

Figure 2:
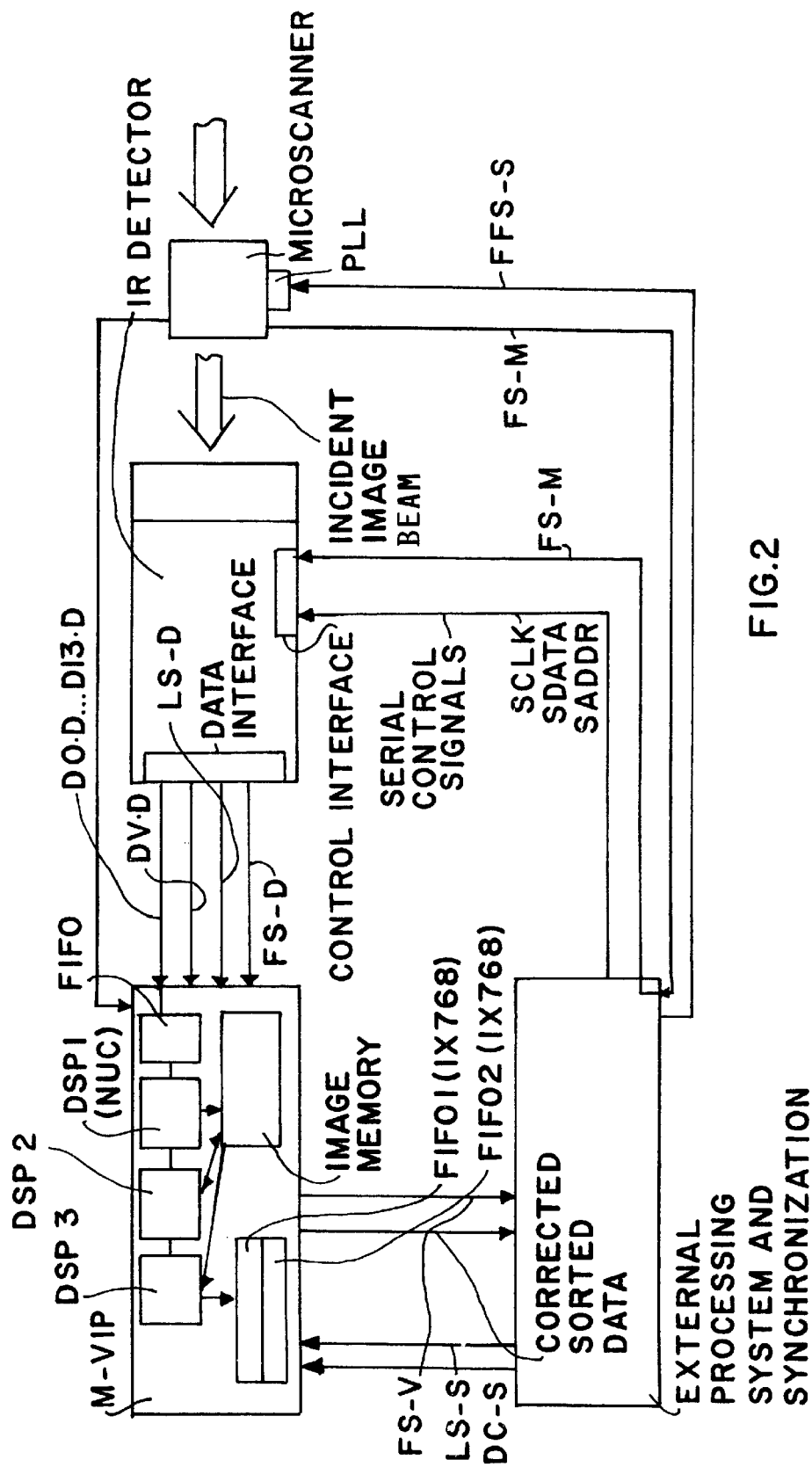
FIG. 2 is a schematic block diagram of the components of an infrared camera system according to the invention.

FIG. 2 schematically illustrates an infrared camera including a suitable circuit arrangement for carrying out and embodying the invention. Generally, the camera includes a housing, an IR detector fixedly arranged relative to the housing, a microscanner interposed in the incident beam path of the image beam falling onto the detector elements of the detector, a video image processing circuit M-VIP, and an external processing system for further processing and synchronization of the image data.

The microscanner is synchronized from the external processing system via a phase locked loop PLL. This externally introduced or influenced PLL loop makes it possible to synchronize various image sources, for example a daylight image provided by a daylight channel as well an infrared image provided by the IR detector. In order to achieve this synchronization, the microscanner receives from the external processing system a first field signal FFS-S which fetches or calls-up the first of e.g. four partial images or fields from the detector, wherein these four successive fields will later be combined, e.g. interlaced, to form a complete image or frame. On its part, the microscanner provides four image or field sync pulses FS-M to the IR detector via the external processing system, and the IR detector samples the image data for one respective partial image or field corresponding to the respective current position of the image projected onto the detector by the microscanner, responsively to each field sync pulse FS-M. More particularly, the IR detector provides its own line start pulse LS-D and field start pulse FS-D to the image processing circuit M-VIP, synchronously with the internal timing or clocking of the IR detector. The IR detector further receives a system clock signal SCLK, data SDATA and addresses SADDR from the external processing system. Furthermore, the detector provides the digitized image data, such as a fourteen bit image data word D0-D to D13-D, as well as a valid data signal DV-D indicating that valid image data are available at the data output. The outputs of the IR detector are all provided through a suitable data interface, while the control inputs to the IR detector are received through a suitable control interface.

The image processing circuit M-VIP includes a plurality of digital signal processors DSP that respectively carry out functions as described next. The image processing circuit M-VIP further comprises a first-in-first-out (FIFO) input memory operating as an asynchronous input buffer, an image data memory, and a double first-in-first-out (FIFO) output memory or buffer. The digital image data D0-D to D13-D are first loaded into the input FIFO as raw image data, and from there are provided to a first digital signal processor DSP1 operating as a non-uniformity correction (NUC) DSP to carry out a correction of the raw image data D0-D to D13-D based on correction coefficients as described above, for example as described in detail in the above cross-referenced U.S. Application. A second digital signal processor DSP2 continuously updates and improves the correction coefficients, for example in connection with the correction process described in the above cross-referenced U.S. Application. A third digital signal processor DSP3 sorts the corrected image data as soon and as quickly as possible, line-by-line according to the sequence or pattern of positions among which the image has been moved relative to the IR detector, for example as described above in connection with FIG. 1.

The resulting sorted and corrected image data are then provided into a first-in-first-out output memory or buffer, which is preferably embodied as a double FIFO buffer FIFO1 and FIFO2. Further first-in-first-out (FIFO) memories or buffers are arranged between the various digital signal processors DSP1, DSP2, and DSP3, but-are not shown for the sake of clarity and simplicity. These interposed. FIFO memories enable the asynchronous processing of operations on the same data basis, i.e. the corresponding raw image data, corrected image data, and corrected coefficients.

The external processing system provides an external line sync pulse LS-S for receiving a respective line of image data that will externally appear as or correspond to a single line of the complete image or frame being formed. This line sync pulse LS-S periodically switches over the double FIFO output memory so that one of the memories or buffers FIFO1 and FIFO2 is respectively always available to the image processing circuit M-VIP for writing the next image data, while the other one of the memories or buffers FIFO1 and FIFO2 is available to the external processing system for reading a line of image data. Accordingly, the corrected and sorted image data are then transferred from the image processing circuit M-VIP to the external processing system in a line-by-line manner. Moreover the image processing circuit M-VIP provides a frame start pulse FS-V to the external processing system as an indication that the first line of a new complete image or frame is ready to be fetched.

Figures 3A, 3B:
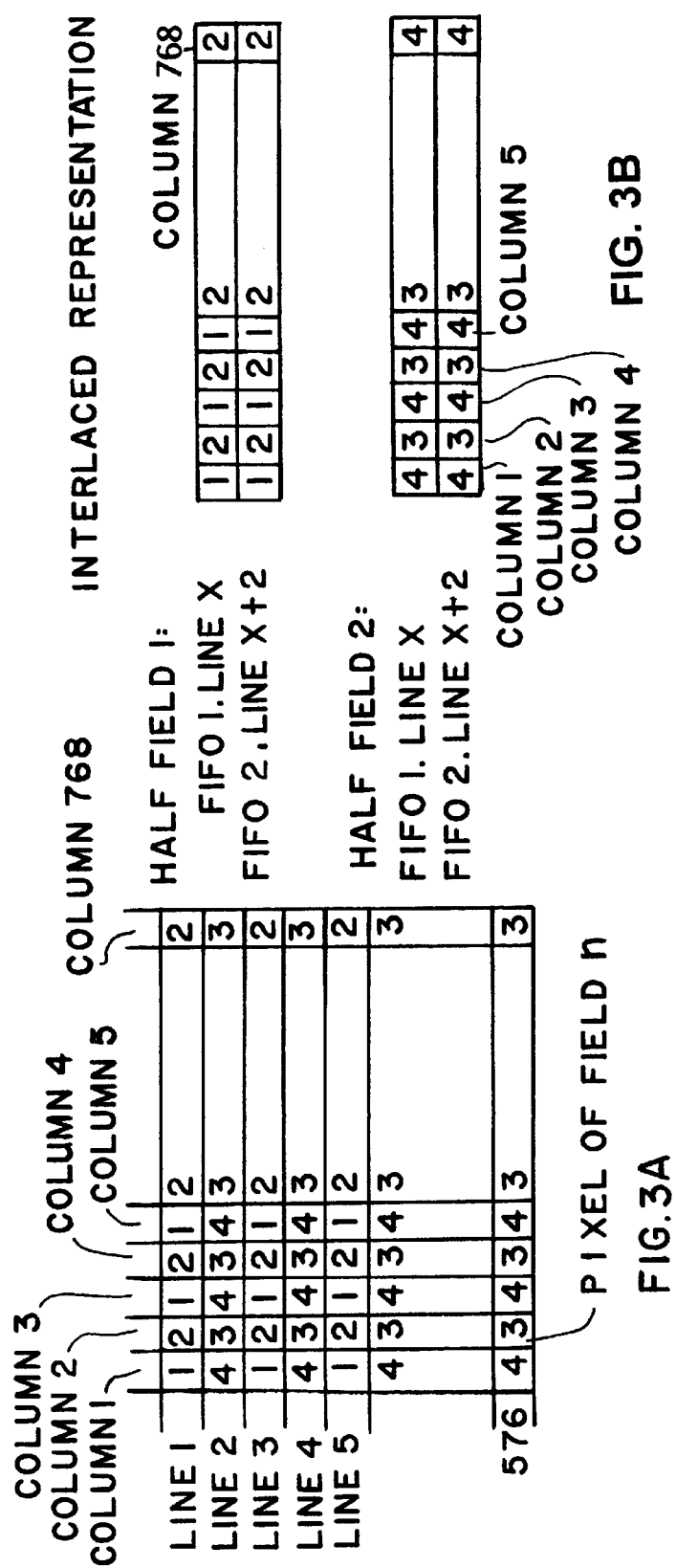
FIG. 3A is a table representing gray levels or pixel intensities stored in an image memory.
FIG. 3B includes two tables representing gray levels or pixel intensities stored in respective FIFO memories for a first partial image or field and a second partial image or field.

FIG. 3A shows a table schematically representing pixels stored in the image memory for a given image, including pixels arranged in lines 1 to 576 and columns 1 to 768. The numbers 1, 2, 3 and 4 in the table of FIG. 3A represent the image positions 1, 2, 3 and 4 shown in FIG. 1, from which the pixel data were respectively acquired. However, the pixel data stored in the image memory actually represent the respective gray level or pixel intensity of each respective pixel. The image position numbers 1, 2, 3 and 4 are shown in FIG. 3A simply to help illustrate how a complete image of higher resolution is generated. For example, a single detector element A provides the pixel data for four image pixels, in this example the four image pixels at lines 1 and 2 and columns 1 and 2, as the image is moved among positions 1, 2, 3 and 4.

Figure 4A:
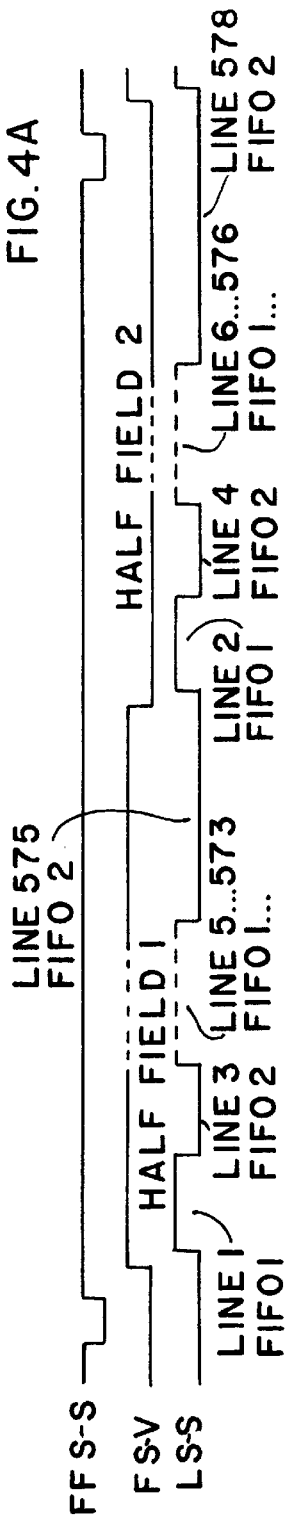
FIGS. 4A and 4B are timing diagrams schematically representing the time sequence and synchronization of the operation of the microscanner with the image processing.
Figure 4B:
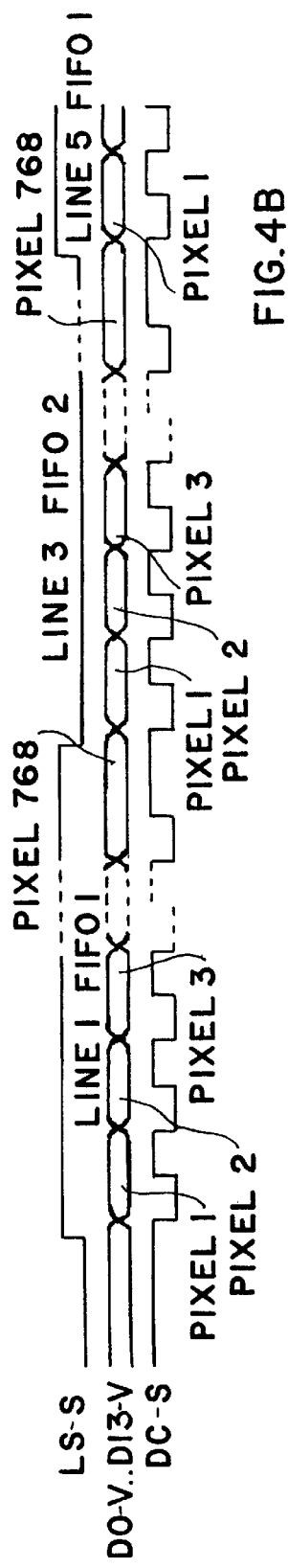

FIG. 3B correspondingly shows the line-by-line image data for a first partial image or half field 1 as stored in the output memory FIFO1 and FIFO2, and for a second partial image or half field 2 as stored in the output memory FIFO1 and FIFO2. Note that the first partial image or half field 1 includes the odd numbered lines 1, 3, 5, 7, etc., while the second partial image or half field 2 includes the even numbered lines 2, 4, 6, 8, etc. of the image data, which are interlaced to form the complete frame. Half field 1 consists of the partial images or fields 1 and 2, and half field 2 consists of the partial images or fields 3 and 4 from the microscanner. FIGS. 4A and 4B show timing diagrams of the sequence of the several signals and the synchronization among the components of the system as described above. In this example, the first field signal FFS-S is ordinarily high, and switches low to initiate a fetch of the next image. The frame or field start pulse FS-V cycles high and low to respectively indicate half field 1 while the signal is high, and half field 2 while the signal is low. The line sync pulse or signal LS-S alternates between high and low values to respectively read out the respective next-successive lines from the alternating output memories FIFO1 and FIFO2, e.g. to successively read line 1 from FIFO1, line 3 from FIFO2, line 5 from FIFO1, etc. for the half field 1, or to successively read lines 2, 4, 6, etc. from FIFO1, FIFO2, FIFO1, etc. for the second half field. In FIG. 4B, signal DC-S is a clocking signal by which the image data are clocked and fetched (on the falling signal edge) and then taken over (on the rising signal edge) out of the respective output FIFO that was selected by the signal LSS. Note that FIG. 4B is shown with an expanded time scale relative to FIG. 4A, to illustrate the details of the read-out of pixels of the successive lines of the image data.

Although the invention has been described with reference to specific example embodiments, it will be appreciated that it is intended to cover all modifications and equivalents within the scope of the appended claims. It should also be understood that the present disclosure includes all possible combinations of -any individual features recited in any of the appended claims.

What is claimed is:

1. A digital infrared camera comprising:
   a housing;
   a detector that is arranged in said housing and that includes a plurality of infrared sensitive detector elements arranged as a two-dimensional array;
   an image processing circuit, including a memory adapted to have stored therein a plurality of correction a coefficients respectively allocated to said detector elements, and including at least one digital signal processor adapted to progressively revise said correction coefficients; and
   a microscanner that is arranged in a beam path of incident radiation falling on said detector and that is adapted to move an image formed on said detector by said incident radiation relative to said detector, wherein said microscanner includes at least one of a movable mirror, a movable prism and a movable lens adapted to deflect said incident radiation.

2. The camera according to claim 1, wherein said detector further includes non-photosensitive areas between neighboring ones of said detector elements.

3. The camera according to claim 1, wherein said detector is stationarily fixed relative to said housing and said image processing circuit.

4. A method of producing a corrected image signal comprising the following steps:
   a) causing an image of an actual scene including at least one scene feature to be incident onto a detector including a plurality of photosensitive detector elements arranged as a two-dimensional array of said elements in an X-direction and a Y-direction;
   b) moving said image relative to said detector and maintaining said detector stationary relative to at least one feature among said at least one scene feature of said scene;
   c) generating with said elements of said detector a raw image signal comprising image pixels having respective pixel intensities;
   d) changing at least some of said pixel intensities responsive to respective correction coefficients respectively allocated to said detector elements to form a corrected image signal; and
   e) changing at least some of said correction coefficients by carrying out a dynamic correction process.

5. The method according to claim 4, expressly excluding moving said detector.

6. The method according to claim 4, wherein said step b) further comprises maintaining said detector stationary relative to the earth.

7. The method according to claim 4, wherein said detector is incorporated in an infrared camera including a housing, said detector fixedly arranged in said housing, and image processing circuitry, and wherein said step b) further comprises maintaining said detector stationary relative to said housing and said image processing circuitry.

8. The method according to claim 4, wherein said step b) is carried out using a scanner arrangement interposed in a beam path of a beam of incident radiation forming said image on said detector, wherein said moving of said image comprises variably deflecting said beam of incident radiation with said scanner arrangement.

9. A method of producing a corrected image signal comprising the following steps:
   a) causing an image to be incident onto a detector including a plurality of photosensitive detector elements arranged as a two-dimensional array of said elements in an X-direction and a Y-direction;
   b) moving at least one of said image and said detector relative to each other;
   c) generating with said elements of said detector a raw image signal comprising image pixels having respective pixel intensities;
   d) changing at least some of said pixel intensities responsive to respective correction coefficients respectively allocated to said detector elements to form a corrected image signal;
   e) changing at least some of said correction coefficients by carrying out a dynamic correction process; and
   f) re-sorting an order of said image pixels in said corrected image signal so as to counteract an influence of said moving of said step b) on said order of said image pixels and to reconstruct said image from said image pixels.

10. The method according to claim 9, wherein said moving of said step b) is carried out cyclically in a repeating cyclic pattern.

11. The method according to claim 9, further comprising repeating said steps a), b), c), d) and e) and respectively forming image fields from said corrected image signal, and wherein said step d) is carried out for each one of said image fields.

12. A method of producing a corrected image signal comprising the following steps:
   a) causing an image to be incident onto a detector including a plurality of photosensitive detector elements arranged as a two-dimensional array of said elements in an X-direction and a Y-direction;
   b) moving at least one of said image and said detector relative to each other cyclically in a repeating cyclic pattern, comprising moving said image step-wise successively to a plurality of positions relative to said detector in a sequence of said positions such that said image is moved successively to said positions that are located between closest neighboring ones of said elements before being moved to at least one of said positions that is located between ones of said elements that are more distant from each other than said closest neighboring ones of said elements;

c) generating with said elements of said detector a raw image signal including image pixels having respective pixel intensities, comprising generating said image pixels of said raw image signal respectively at each time when said image is at a respective one of said positions;

d) changing at least some of said pixel intensities responsive to respective correction coefficients respectively allocated to said detector elements to form a corrected image signal; and e) changing at least some of said correction coefficients by carrying out a dynamic correction process.

13. A method of producing a corrected image signal comprising the following steps:

a) causing an image to be incident onto a detector including a plurality of photosensitive detector elements arranged as a two-dimensional array of said elements in an X-direction and a Y-direction;

b) moving at least one of said image and said detector relative to each other, comprising sequentially moving said image in a repetitive pattern among four positions relative to said detector, wherein said four positions are located at corners of an imaginary rectangle, and wherein said pattern comprises in sequence moving said image from a first one of said positions to a second one of said positions in said Y-direction, then moving said image from said second position to a third one of said positions in a direction extending diagonally relative to said X-direction and said Y-direction, then moving said image from said third position to a fourth one of said positions in said Y-direction, and then moving said image from said fourth position to said first position in another direction extending diagonally relative to said X-direction and said Y-direction;

c) generating with said elements of said detector a raw image signal comprising image pixels having respective pixel intensities;

d) changing at least some of said pixel intensities responsive to respective correction coefficients respectively allocated to said detector elements to form a corrected image signal; and e) changing at least some of said correction coefficients by carrying out a dynamic correction process.

14. A method of producing a corrected image signal comprising the following steps:

a) causing an image to be incident onto a detector including a plurality of photosensitive detector elements arranged as a two-dimensional array of said elements in an X-direction and a Y-direction;

b) moving at least one of said image and said detector relative to each other, comprising sequentially moving said image in a repetitive pattern among four positions relative to said detector, wherein said four positions are located at corners of an imaginary rectangle, and wherein a time required for moving said image from a given one of said positions to either of the two closest neighboring positions of said given one of said positions is at most one half of a frame interval of said corrected image signal;

c) generating with said elements of said detector a raw image signal comprising image pixels having respective pixel intensities;

d) changing at least some of said pixel intensities responsive to respective correction coefficients respectively allocated to said detector elements to form a corrected image signal; and e) changing at least some of said correction coefficients by carrying out a dynamic correction process.

15. A method of producing a corrected image signal comprising the following steps:

a) causing an image to be incident onto a detector including a plurality of photosensitive detector elements arranged as a two-dimensional array of said elements in an X-direction and a Y-direction;

b) moving at least one of said image and said detector relative to each other, by moving said image successively to four positions relative to said detector;

c) generating with said elements of said detector a raw image signal including four successive image fields comprising image pixels having respective pixel intensities;

d) changing at least some of said pixel intensities responsive to respective correction coefficients respectively allocated to said detector elements to form a corrected image signal;

e) changing at least some of said correction coefficients by carrying out a dynamic correction process; and f) combining said image pixels of said four successive image fields to form a single image frame having an image resolution twice that of a physical resolution of said detector.

16. A method of producing a corrected image signal comprising the following steps:

a) directing an incident beam of radiation via a scanner to impinge onto a detector including a plurality of photosensitive detector elements arranged as a two-dimensional array of said elements;

b) deflecting said incident beam of radiation using said scanner so as to move said incident beam impinging on said detector relative to said detector;

c) generating with said detector elements of said detector a raw image signal comprising image pixels having respective pixel intensities; and d) changing at least some of said pixel intensities of said image pixels and re-sorting an order of said image pixels of said raw image signal to form a corrected image signal.

* * * * *

UNITED STATES PATENT AND TRADEMARK OFFICE
CERTIFICATE OF CORRECTION

PATENT NO.     : 6,591,021 B1                                            Page 1 of 1
DATED          : July 8, 2003
INVENTOR(S)    : Breiter et al.

It is certified that error appears in the above-identified patent and that said Letters Patent is hereby corrected as shown below:

Column 3,
Line 21, after "levels", replace "Uke" by -- Ukj --;
Line 22, after "levels", replace "UkG" by -- Ukj --;
Line 33, after "U.S.", replace "patent application" by -- Patent Application --;
Line 56, after "method", replace "and-an" by -- and an --.

Column 4,
Line 30, after "be", replace "stationary" by -- stationarily --.

Column 6,
Line 44, after "incident", replace "on-the" by -- on the --.

Column 7,
Line 7, after "U.S.", replace "patent application" by -- Patent Application --.

Column 8,
Line 2, after "one", replace "fourth.of" by -- fourth of --;
Line 37, after "such", replace "image-errors" by -- image errors --;
Line 54, after "U.S.", replace "patent application" by -- Patent Application --;
Line 59, after "of", replace "the-detector" by -- the detector --.

Column 10,
Line 23, after "DSP3,", replace "but-are" by -- but are --;
Line 24, after "These", replace "interposed. FIFO" by -- interposed FIFO --.

Column 11,
Line 21, after "signal", replace "LSS." by -- LS-S. --.

Signed and Sealed this

Twenty-third Day of September, 2003

JAMES E. ROGAN
*Director of the United States Patent and Trademark Office*